US010684927B2

(12) United States Patent
Nanduri et al.

(10) Patent No.: US 10,684,927 B2
(45) Date of Patent: Jun. 16, 2020

(54) METHODS AND SYSTEMS FOR STORING INFORMATION THAT FACILITATES THE RECONSTRUCTION OF AT LEAST SOME OF THE CONTENTS OF A STORAGE UNIT ON A STORAGE SYSTEM

(71) Applicant: HEWLETT PACKARD ENTERPRISE DEVELOPMENT LP, Houston, TX (US)

(72) Inventors: Anil Nanduri, Sunnyvale, CA (US); Chunqi Han, Pleasanton, CA (US); Murali Krishna Vishnumolakala, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 324 days.

(21) Appl. No.: 14/446,191

(22) Filed: Jul. 29, 2014

(65) Prior Publication Data

US 2016/0034209 A1 Feb. 4, 2016

(51) Int. Cl.
*G06F 11/00* (2006.01)
*G06F 11/20* (2006.01)
*G06F 11/10* (2006.01)
*G06F 3/06* (2006.01)

(52) U.S. Cl.
CPC ......... *G06F 11/2094* (2013.01); *G06F 3/065* (2013.01); *G06F 3/0614* (2013.01); *G06F 3/0689* (2013.01); *G06F 11/1076* (2013.01); *G06F 11/1092* (2013.01);
(Continued)

(58) Field of Classification Search
None
See application file for complete search history.

(56) References Cited

U.S. PATENT DOCUMENTS

| 5,533,190 A | 7/1996 | Binford et al. |
| 6,594,745 B2 | 7/2003 | Grover |
| 7,143,308 B2 | 11/2006 | Tseng et al. |

(Continued)

OTHER PUBLICATIONS

Green; et al., "Designing a Fast, On-line Backup System for a Log-structured File System", Digital Technical Journal (1996), 8(2):32-45.
(Continued)

*Primary Examiner* — Reginald G Bragdon
*Assistant Examiner* — Michael L Westbrook
(74) *Attorney, Agent, or Firm* — Hewlett Packard Enterprise Patent Department

(57) ABSTRACT

The failure of a storage unit in a storage array of a storage system may render the storage unit unresponsive to any requests. Any writes to the storage system that occur during the failure of the storage unit will not be reflected on the failed unit, rendering some of the failed unit's data stale. Assuming the failed unit's data is not corrupted but is just stale, a partial rebuild may be performed on the failed unit, selectively reconstructing only data that is needed to replace the stale data. Described herein are techniques for storing information that identifies the data that needs to be rebuilt. When the storage unit fails, the segment identifier associated with the last data segment written to the storage system may be stored. Upon the storage unit recovering, the storage system can rebuild only those data segments whose identifier is greater than the stored segment identifier.

6 Claims, 21 Drawing Sheets

(52) U.S. Cl.
CPC ...... *G06F 11/2082* (2013.01); *G06F 2201/84* (2013.01); *G06F 2211/104* (2013.01)

(56) References Cited

U.S. PATENT DOCUMENTS

| | | | | |
|---|---|---|---|---|
| 8,812,901 | B2* | 8/2014 | Sheffield, Jr. ....... | G06F 11/1662 714/6.2 |
| 2003/0120863 | A1* | 6/2003 | Lee ..................... | G06F 11/1084 711/114 |
| 2004/0078637 | A1* | 4/2004 | Fellin ................. | G06F 11/1443 714/6.3 |
| 2006/0161805 | A1* | 7/2006 | Tseng ................. | G06F 11/1084 714/6.22 |
| 2008/0010641 | A1* | 1/2008 | Zhao .................. | G05B 23/0264 718/101 |
| 2014/0089730 | A1* | 3/2014 | Watanabe ........... | G06F 11/1092 714/6.22 |
| 2015/0127891 | A1* | 5/2015 | Yang .................... | G06F 3/0619 711/103 |
| 2015/0205669 | A1* | 7/2015 | Sundaram ........... | G06F 11/1092 714/6.23 |

OTHER PUBLICATIONS

"Reducing RAID Recovery Downtime", Seagate Technologies LLC (2011), Technology Paper, 4 pgs.

Rosenblum, "The Design and Implementation of a Log-structured File System", Dissertation (1992), 101 pgs.

Sobti; et al., "PersonalRAID: Mobile Storage for Distributed and Disconnected Computers", Proceedings of the FAST '02 Conference on File and Storage Technologies (2002), pp. 159-174 of the Proceedings, 16 pgs.

Office Action dated Nov. 23, 2015, from the United States Patent and Trademark Office, for U.S. Appl. No. 14/463,567, filed Aug. 19, 2014, 17 pgs.

Amendment filed Feb. 5, 2016, for U.S. Appl. No. 14/463,567, filed Aug. 19, 2014, 8 pgs.

Final Office Action dated Mar. 21, 2016, for U.S. Appl. No. 14/463,567, filed Aug. 19, 2014, 19 pgs.

Amendment filed Jun. 8, 2016, for U.S. Appl. No. 14/463,567, filed Aug. 19, 2014, 8 pgs.

Advisory Action dated Jun. 23, 2016, for U.S. Appl. No. 14/463,567, filed Aug. 19, 2014, 7 pgs.

Amendment and Response to Final Office Action submitted Jun. 28, 2016, for U.S. Appl. No. 14/463,567, filed Aug. 19, 2014, 10 pgs.

"Sun StorEdge Network Data Replicator Software Boosts Data Center Resilience", Sun Microsystems, Inc., White Paper (Aug. 4, 2003), retrieved from: http://web.archive.org/web/20030804112623/http://www.sun.com/storage/white-papers/sndr.html, 16 pgs.

Amendment filed Nov. 29, 2016, for U.S. Appl. No. 14/463,567, filed Aug. 19, 2014, 10 pgs.

Office Action dated Jul. 15, 2016, for U.S. Appl. No. 14/463,567, filed Aug. 19, 2014, 19 pgs.

Final Office Action dated Mar. 6, 2017, for U.S. Appl. No. 14/463,567, filed Aug. 19, 2014, 20 pages.

Amendment filed May 1, 2017, for U.S. Appl. No. 14/463,567, filed Aug. 19, 2014, 11 pages.

Non-Final Office Action dated Jun. 2, 2017, from U.S. Appl. No. 14/463,567, filed Aug. 19, 2014, 18 pages.

* cited by examiner

| Segment Identifier | Stripe Number |
|---|---|
| 109 | 6 |
| 110 | 0 |
| 111 | 1 |
| 112 | 5 |
| 113 | 2 |
| 114 | 7 |
| 115 | 4 |
| | |
| | |
| | |

Fig. 3

| Segment Identifier | Stripe Number |
|---|---|
| 110 | 0 |
| 112 | 5 |
| 113 | 2 |
| 114 | 7 |
| 115 | 4 |
| 116 | 1 |
| 117 | 6 |

Fig. 6

| | Disk 0 | Disk 1 | Disk 2 | Disk 3 |
|---|---|---|---|---|
| Stripe 0 | d.00 | -- | d.02 | P.0' |
| Stripe 1 | d.10' | -- | d.12' | P.1' |
| Stripe 2 | d.20 | -- | d.22 | P.2' |
| Stripe 3 | | -- | | |
| Stripe 4 | d.40' | -- | d.42' | P.4' |
| Stripe 5 | d.50 | -- | d.52 | P.5 |
| Stripe 6 | d.60' | -- | d.62' | P.6' |
| Stripe 7 | d.70 | -- | d.72 | P.7 |

Fig. 7

METHODS AND SYSTEMS FOR STORING INFORMATION THAT FACILITATES THE RECONSTRUCTION OF AT LEAST SOME OF THE CONTENTS OF A STORAGE UNIT ON A STORAGE SYSTEM

FIELD OF THE INVENTION

The present invention relates to methods and systems for reconstructing at least some of the contents of a storage unit following the failure of the storage unit, and more particularly relates to efficiently storing information that facilitates such reconstruction process.

BACKGROUND

In a storage system with a plurality of storage units, data is often stored in a redundant manner. When one or more of the storage units experiences a failure and its associated data is lost, data redundancy allows the data of the failed storage units to be recovered from the operational storage units (assuming there is sufficient redundancy). While it is certainly beneficial that data on a failed storage unit can be recovered, there are certain costs (and concerns) associated with the data recovery process.

First, data recovery consumes resources of the storage system that would otherwise be available to process read and/or write requests of a host. For example, data recovery in most cases involves reading content from the operational storage units in order to recover the lost data. In many cases, once the content is read (e.g., in the form of data blocks and parity blocks), it must be further processed in order to reconstruct the lost data. Such reads and processing of a data recovery process may increase the time it takes for a storage system to respond to read and write requests from a host.

Second, the longer the data recovery process takes, the longer the storage system operates in a degraded mode of operation. In a degraded mode, any data requested from the failed storage unit must be first reconstructed (if it has not already been reconstructed) before the request can be fulfilled, increasing a storage system's response time to read requests. Further, a reduced level of data redundancy makes the storage system more vulnerable to permanent data loss.

One way to address such concerns is to shorten the data recovery process, and one way to shorten the data recovery process is to reduce the amount of data that needs to be recovered. Such approach, of course, is not always possible. Indeed, if all the data of a storage unit were lost and that data is needed, there is no choice but to reconstruct all the data of the storage unit, in a process known as a "full rebuild" or a "full reconstruction". In other cases, however, rebuilding only a subset of the data may be sufficient.

For example, when a storage unit fails, sometimes its data is not lost. In other words, a failure of a storage unit may render the storage unit unresponsive to any read or write requests, but its data is left intact. Upon recovery of the failed storage unit, the problem is that any writes to the storage system that occurred during the failure of the storage unit will not be reflected on the failed storage unit, rendering some of its data "stale". In this scenario, it is possible to perform a partial rebuild (rather than a full rebuild) on the failed unit, only reconstructing data that is needed to replace the stale data.

While a partial rebuild is preferable to a full rebuild (reducing the amount of time that the system is in a degraded mode of operation and reducing the processing of the storage system), a tradeoff is that the storage system is required to keep track of which data needs to be rebuilt, which takes additional resources as compared to a full rebuild process.

SUMMARY OF THE INVENTION

In one embodiment, information from a log structured file system may be utilized to determine which portions of data to rebuild in a partial rebuild process. In a log structured file system, data is written to a storage system in fixed-sized blocks called "data segments", and a segment identifier is used to identify each data segment. Each new data segment may be assigned a segment identifier that is greater than the maximum segment identifier that previously existed in the storage system. Consequently, the sequence of segment identifiers that is allocated over time could be a monotonically increasing sequence (or a strictly monotonically increasing sequence).

In one embodiment, when a first one of the storage units fails, an identifier of the first storage unit and the segment identifier associated with the last data segment that was written to the storage system (prior to the failure of the first storage unit) are stored in a persistent storage. Upon the first storage unit being recovered (and assuming that none of its data is lost), the storage system can refer to the information in the persistent storage to facilitate a partial rebuild of the failed storage unit. First, the storage system may determine which storage unit needs the partial rebuild based on the storage unit identifier stored in the persistent storage. Second, the storage system may rebuild only those data segments whose segment identifier is greater than the stored segment identifier.

In another embodiment, when a first one of the storage units fails, the identifier of the first storage unit and a first segment identifier associated with the last data segment that was written to the storage system (prior to the failure of the first storage unit) are stored in a persistent storage. Upon the first storage unit being recovered, a second segment identifier associated with the last data segment that was written to the storage system (prior to the recovery of the first storage unit) is stored in the persistent storage. Assuming that none of the data of the first storage unit was lost, the storage system can refer to the information in the persistent storage to facilitate a partial rebuild of the failed storage unit. First, the storage system may determine which storage unit needs the partial rebuild based on the storage unit identifier stored in the persistent storage. Second, the storage system may rebuild only those segments whose segment identifier is larger than the first segment identifier and less than or equal to the second segment identifier.

In another embodiment, the storage system may maintain a segment map in a persistent storage, the segment map associating a plurality of segment identifiers with a plurality of stripe numbers. Prior to a first one of the storage units failing, the storage system may process a first sequence of write requests, the first sequence of write requests being associated with a first sequence of the segment identifiers. In response to the first storage unit failing, the storage system may store a first one of the segment identifiers from the segment map on a second one of the storage units, the first segment identifier being associated with the last write request that was processed from the first sequence of write requests. Subsequent to the first storage unit failing and prior to a recovery of the first storage unit, the storage system may process a second sequence of write requests, the second sequence of write requests being associated with a second sequence of the segment identifiers. Subsequent to the first storage unit being recovered, the storage system may determine a set of stripe numbers associated with content to be rebuilt on the first storage unit, the determination being based on the segment map and the first segment identifier.

In another embodiment, the storage system may maintain a segment map in a persistent storage, the segment map associating a plurality of segment identifiers with a plurality of stripe numbers. In response to a first one of the storage units failing, the storage system may store a first one of the segment identifiers from the segment map on a second one of the storage units, the first segment identifier being associated with the last data segment that was written on the storage array before the failure of the first storage unit. In response to the first storage unit being recovered, the storage system may store a second one of the segment identifiers from the segment map on the second storage unit, the second segment identifier being associated with the last data segment that was written on the storage array before the recovery of the first storage unit. Based on the segment map and the first and second segment identifiers, the storage system may determine a set of stripe numbers associated with content to be rebuilt on the first storage unit.

These and other embodiments of the invention are more fully described in association with the drawings below.

BRIEF DESCRIPTION OF THE DRAWINGS

FIG. 3 depicts an example of a segment map, in accordance with one embodiment.

FIG. 6 depicts the segment map of FIG. 3 at a later point in time, in accordance with one embodiment.

FIG. 7 depicts the data blocks and error-correction blocks of a storage array after the failure of one of its storage units and after the processing of a plurality of write requests, in accordance with one embodiment.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps. While the flow diagrams each present a series of steps in a certain order, the order of the steps is for one embodiment and it is understood that the order of steps may be different for other embodiments.

Figure 1:
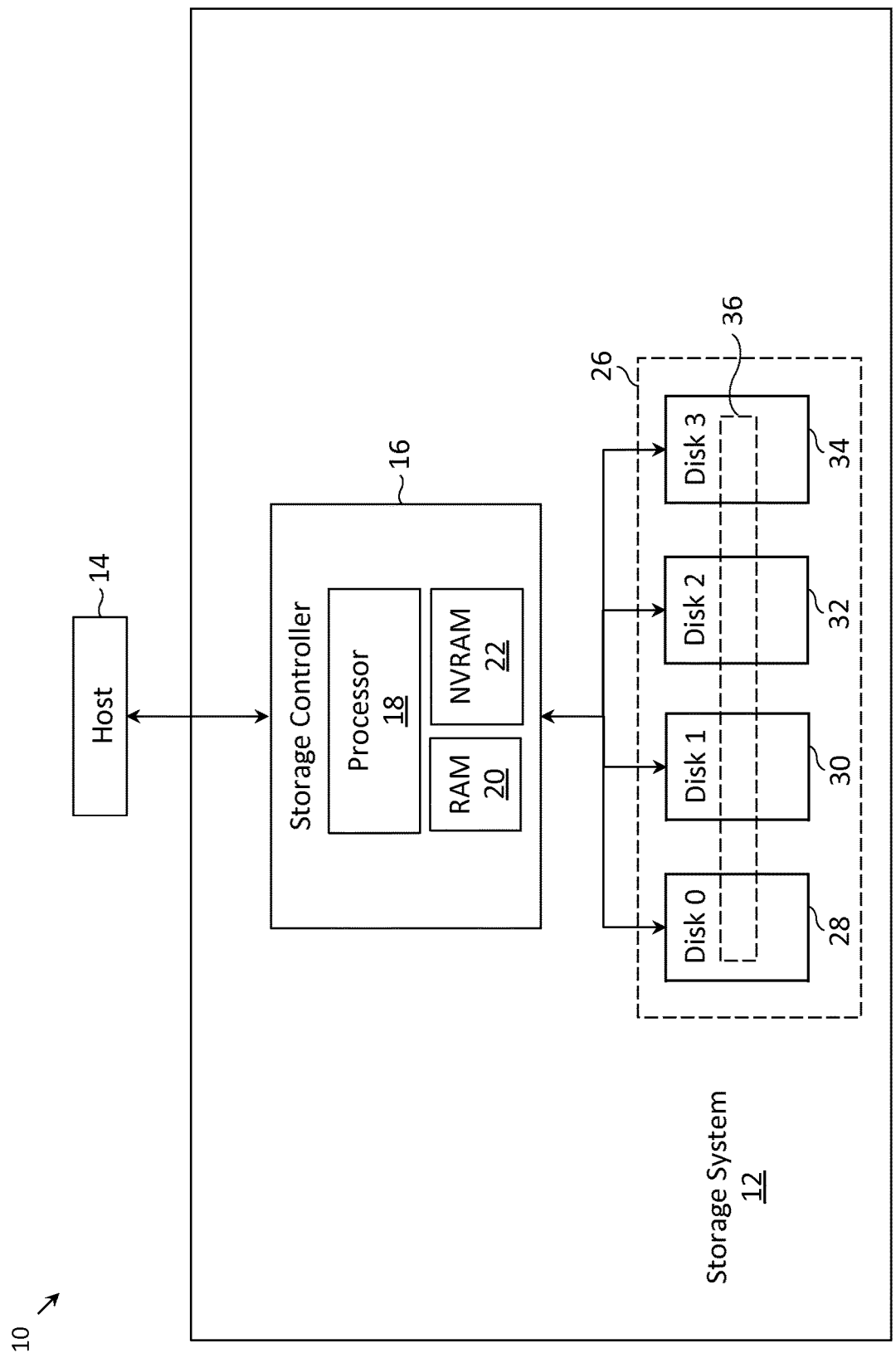
FIG. 1 depicts a storage system communicatively coupled to a host, in accordance with one embodiment.

FIG. 1 depicts system 10 in which storage system 12 may be communicatively coupled to host 14, in accordance with one embodiment. Host 14 may transmit read and/or write requests to storage system 12, which in turn may process the read and/or write requests. While not depicted, storage system 12 may be communicatively coupled to host 14 via a network. The network may include a LAN, WAN, MAN, wired or wireless network, private or public network, etc.

Storage controller 16 of storage system 12 may receive the read and/or write requests and may process the read and/or write requests by, among other things, communicating with one or more of a plurality of storage units (28, 30, 32, 34). The plurality of storage units may be collectively referred to as storage array 26. While each of the storage units is depicted as a disk drive in FIG. 1, the techniques of the present invention are not limited to storage devices employing magnetic disk based storage. More generally, techniques of the present invention may be applied to a plurality of storage units including one or more solid-state drives (e.g., flash drives), magnetic disk drives (e.g., hard disk drives), optical drives, etc. While four disk drives have been depicted in storage array 26, this is not necessarily so, and a different number of disk drives may be employed in storage array 26.

Storage controller 16 may include processor 18, random access memory (RAM) 20 and non-volatile random access memory (NVRAM) 22. Processor 18 may direct the handling of read and/or write requests, and may oversee the reconstruction of at least some of the contents of a failed storage unit. More specifically, processor 18 may perform any of the processes described below in association with FIGS. 15-20. RAM 20 may store instructions that, when executed by processor 18, cause processor 18 to perform one or more of the processes of FIGS. 15-20. RAM 20 may also act as a buffer, storing data yet to be processed read and/or write requests, storing data that has been retrieved from storage array 26 but not yet provided to host 14, etc. NVRAM 22 may store data that must be maintained, despite a loss of power to storage system 12.

Segment map 36 may be stored in NVRAM 22 or storage array 26 (as is depicted in FIG. 1), or both. In a preferred embodiment, a plurality of updates to segment map 36 may be aggregated in NVRAM 22, before being written to storage array 26 in a batch. Segment map 36 associates a plurality of segment identifiers with a plurality of stripe numbers, and is further described below in association with FIGS. 3 and 6.

Figure 2:
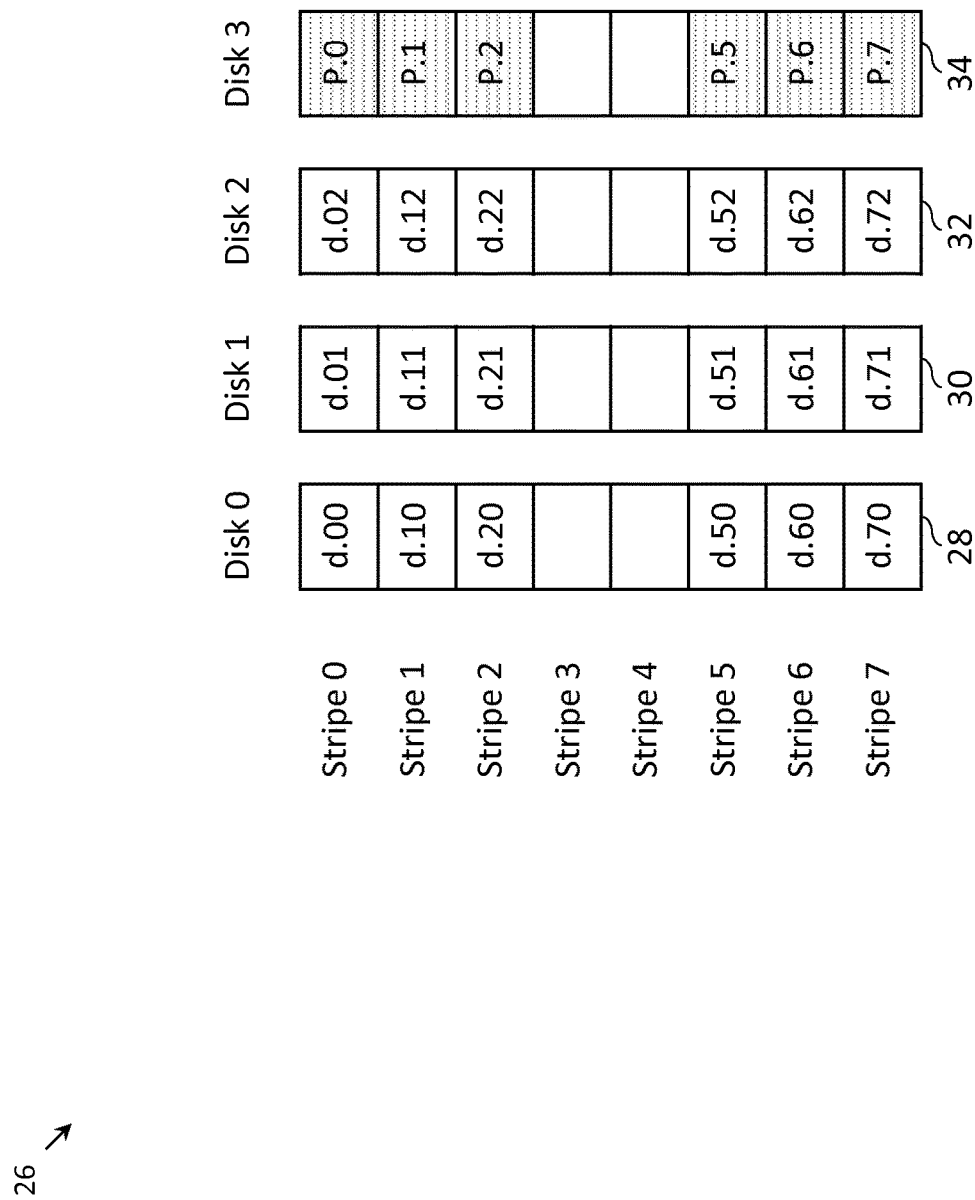
FIG. 2 depicts an arrangement of data blocks and error-correction blocks on a storage array, in accordance with one embodiment.

FIG. 2 depicts one possible arrangement of data blocks and error-correction blocks on storage array 26. It is noted that the information depicted in FIG. 2 may only be a partial representation of the information stored on storage array 26. For example, segment map 36 is depicted in the storage array 26 of FIG. 1, but is not depicted in FIG. 2 so as to not unnecessarily clutter the presentation of FIG. 2. The term "error-correction block(s)" will be used to generally refer to any block(s) of information that is dependent on one or more data blocks and can be used to recover one or more data blocks. An example of an error-correction block is a parity block, which is typically computed using XOR operations. It is noted that an XOR operation is only one operation that may be used to compute an error-correction block, and more generally, an error-correction block may be computed based on a code, such as a Reed-Solomon code. The term "data block(s)" will be used to generally refer to any block(s) of information that might be transmitted to or from host 14. Further, it is noted that the term "block" is used to generally refer to any collection of information typically represented as one or more binary strings (e.g., "01010100").

For clarity of description, reference labels are used to refer to particular data blocks. For instance, d.00 is a reference label used to refer to a data block stored on disk 0. For clarity of notation, reference labels associated with data blocks begin with the letter "d", while reference labels associated with error-correction blocks begin with the letter "P". For clarity of presentation, error-correction blocks are illustrated with a striped pattern. The information stored by a data block is typically in the form of a binary string (e.g., "0010101001 . . ."). Similarly, the information stored by an error-correction block is typically in the form of a binary string (e.g., "10101010100 . . ."). Entries of the storage unit without any data or error-correction blocks have been left blank.

The arrangement of data blocks and error-correction blocks of FIG. 2 is representative of a RAID 4 data redundancy scheme, in which one of the storage units (i.e., disk 3 in FIG. 2) is dedicated for storing error-correction blocks, and all other storage units (i.e., disks 0-2) are dedicated for storing data blocks. The data blocks in each row of the arrangement may belong to a data segment. For example, data blocks d.00, d.01 and d.02 may belong to a data segment, and the data segment (i.e., including d.00, d.01 and d.02) along with its error-correction block P.0 may be stored at the location of stripe 0 (which corresponds to the top row of the arrangement). To elaborate, a stripe may be interpreted as a container for storing a data segment (and its associated error-correction block), and a stripe number may be used to identify a particular stripe. A stripe typically includes a plurality of storage locations distributed across the storage units of storage array 26. While a RAID 4 data redundancy scheme is used to explain techniques of the present invention (for ease of explanation), the techniques of the present invention can be applied to other redundancy schemes, such as RAID 5, RAID 6, RAID 7, etc.

FIG. 3 depicts segment map 36 that allows storage system 12 to determine where a data segment is stored in storage array 26. For example, from segment map 36, storage system 12 can determine that the data segment with segment identifier 112 is stored at stripe number 5 (i.e., comprising the data blocks d.50, d.51 and d.52). More generally, segment map 36 associates each segment identifier with a stripe number.

In one embodiment of a log structured file system, each new data segment is assigned a segment identifier that is greater than the maximum segment identifier that previously existed on the storage system. For example, the next segment identifier added to segment map 36 could be segment identifier 116. Consequently, the sequence of segment identifiers that is allocated over time may be a monotonically increasing sequence (or a strictly monotonically increasing sequence). Typically, a segment identifier is a 64-bit number, so there is not a concern that storage system 12 will ever reach the maximum segment identifier and need to wrap the segment identifier around to 0.

Conceptually, segment map 36 may be viewed as a timeline, recording the order in which storage system 12 has written to the stripes of storage array 26 over time. Segment map 36 indicates that a data segment was written to stripe number 6, then a data segment was written to stripe number 0, then a data segment was written to stripe number 1, and so on. To be more precise, segment map 36 may only provide a partial timeline, as entries (i.e., rows) of the segment map 36 could be deleted. In other words, the stripe numbers are ordered in chronological order (with respect to ascending segment identifiers), but the sequence of the stripe numbers could have some missing entries due to deleted data segments. For example, if the data segment with segment identifier 113 were deleted, the row with segment identifier 113 could be deleted from segment map 36.

When a data segment is modified, it is assigned a new segment identifier. For instance, if the data segment with segment identifier 111 was modified, a new row in segment map 36 could be created, associating segment identifier 116 with stripe number 1 (i.e., the stripe number formerly associated with segment identifier 111); and the row with segment identifier 111 could be deleted.

While a log structured file system could have a sequence of monotonically increasing segment identifiers, other sequences of segment identifiers could be used, so long as the sequence can be used to distinguish at least two points in time. For example, a monotonically decreasing (or strictly monotonically decreasing) sequence of segment identifiers could be used, in which time progression could be associated with decreasing segment identifiers. It is noted that another name for a monotonically increasing sequence is a non-decreasing sequence and another name for a monotonically decreasing sequence is a non-increasing sequence. Increasing (or decreasing) segment identifiers could be associated with progressing time, while a run of identical segment identifiers could be associated with a time period.

Figure 4:
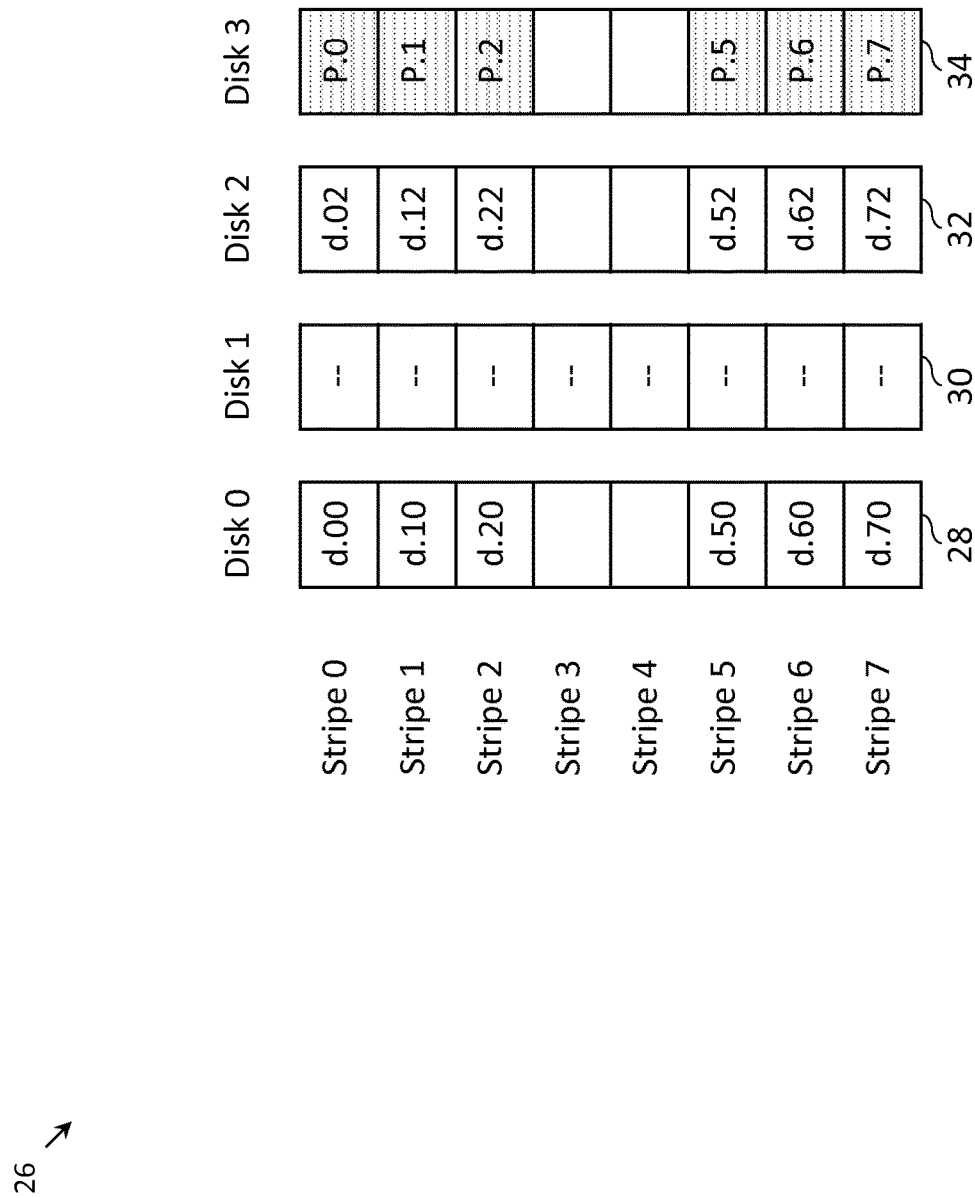
FIG. 4 depicts the data blocks and error-correction blocks of a storage array after the failure of one of its storage units, in accordance with one embodiment.

In FIGS. 4-14, a partial rebuild process employing techniques of one embodiment of the present invention is described in more detail. FIG. 4 depicts the scenario in which disk 1 has failed. All the contents of the disk 1 are no longer accessible, and hence the contents of disk 1 are represented as "--".

Figure 5:
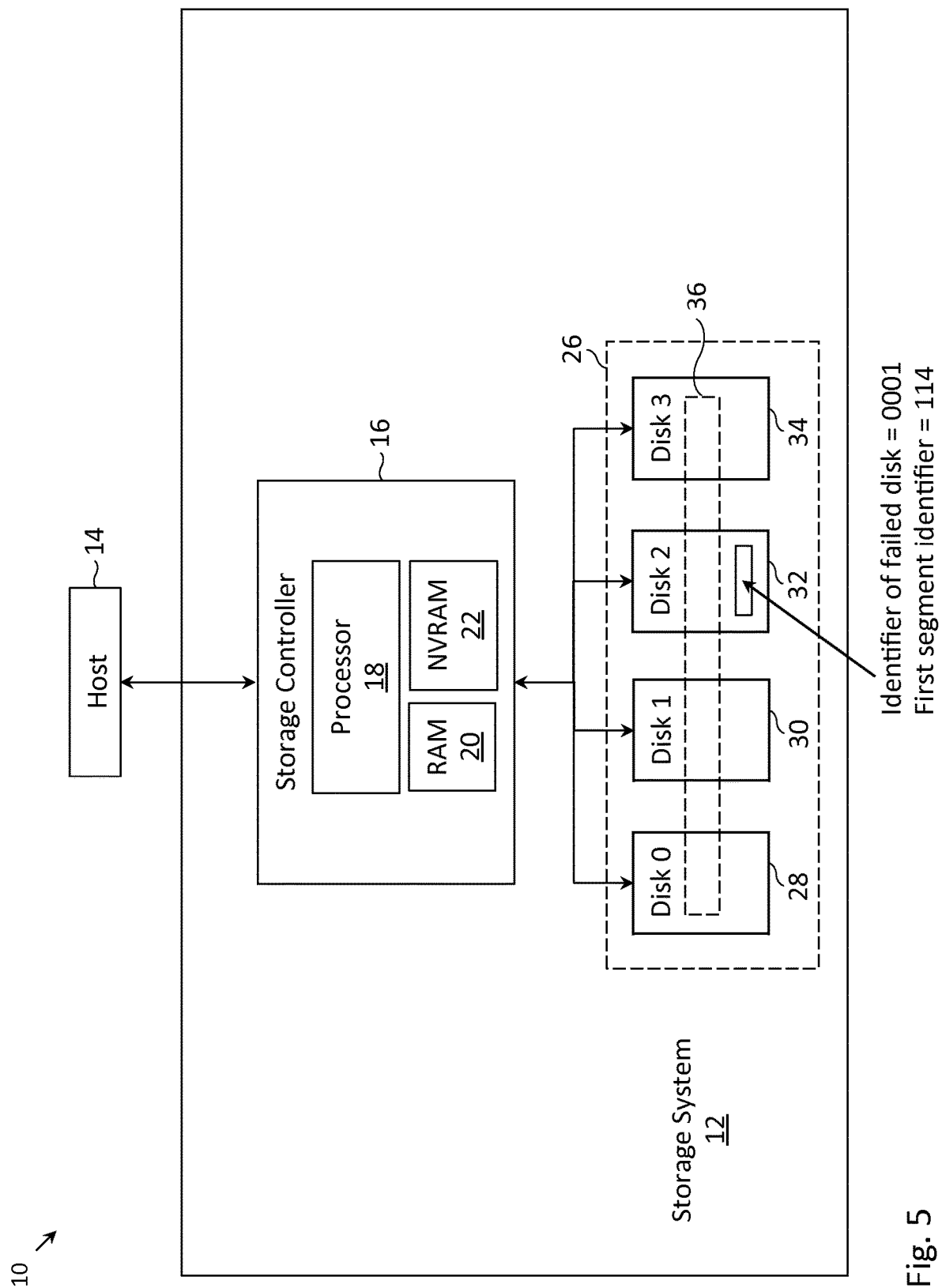
FIG. 5 depicts a storage system communicatively coupled to a host, and in particular information on a storage array that may facilitate the reconstruction of at least some of the contents of a storage unit of the storage array, in accordance with one embodiment.

In FIG. 5, information for facilitating a partial rebuild process of a failed storage unit may be stored on persistent storage (e.g., storage unit 32, also referred to as disk 2). The information may include an identifier of the failed storage unit (e.g., a serial number of the failed storage unit). In the current example, assume the identifier of disk 1 (which has failed) is 0001, so 0001 is stored on the persistent storage. The information may also include the segment identifier associated with the last data segment that was written to storage array 26 prior to the failure of disk 1. In the current example, assume that the data segment with segment identifier 114 was the last data segment to be fully written to storage array 26. In other words, (referring to FIGS. 2), d.70, d.71, d.72 and P.7 were the last information blocks to be written to storage array 26 before the failure of disk 1. Therefore, as depicted in FIG. 5, the segment identifier stored on the persistent storage is 114.

It is noted that the segment identifier that is stored on the persistent storage may not be the maximum segment identifier that is present in segment map 36. In the currently discussed example, segment identifier 114 was stored on the persistent storage, but segment map 36 also contained segment identifier 115. Such segment identifiers (i.e., those greater than the segment identifier written to the persistent storage) could correspond to a data segment that was only partially written to storage array 26 when one of its storage units failed. Alternatively or in addition, such segment identifiers could also correspond to data segments located in a write buffer (e.g., in a portion of RAM 20 or in a portion of NVRAM 22) that have not yet been written to storage array 26 prior to the failure of the storage unit.

In FIG. 5, the information to be used to facilitate a partial rebuild process is stored on disk 2 (e.g., in RAID superblock of disk 2). In another embodiment, such information could be stored on one or more of the storage units that are still in operation. Indeed, such information could be stored on disk 0, disk 2 and disk 3, for extra reliability (e.g., in RAID superblocks of disks 0, 2 and 3). In yet another embodiment, such information could be stored in NVRAM 22.

After the failure of disk 1, storage system 12 may process additional write requests, and for purposes of explanation, assume that two additional write requests are received. The state of segment map 36 is depicted in FIG. 6 following these two write requests. The first request is to modify the data segment with segment identifier 111, and the second request (following the first request) is to modify the data segment with segment identifier 109. As a result of the first request, the entry with segment identifier 111 is deleted from segment map 36 and a new entry mapping segment identifier 116 to stripe number 1 (i.e., the stripe number formerly associated with segment identifier 111) is added to segment map 36. As a result of the second request, the entry with segment identifier 109 is deleted from segment map 36 and a new entry mapping segment identifier 117 to stripe number 6 (i.e., the stripe number formerly associated with segment identifier 109) is added to segment map 36.

Further assume that the data segments with segment identifiers 115, 116 and 117 are written to storage array 26 while disk 1 has failed (i.e., while storage array 26 is in a degraded mode of operation). The state of storage array 26 is depicted in FIG. 7 following such data segments being written to the storage array. Stripe 4 of storage array 26 is now occupied with data blocks d.40' and d.42', and error-correction block P.4'. Notice that no data block has been written to disk 1, since it has failed. Stripe 1 of storage array 26 is now occupied with data blocks d.10' and d.12', and error-correction block P.1', and stripe 6 of storage array 26 is now occupied with data blocks d.60' and d.62', and error-correction block P.6'

It is noted that some of the data and error-correction blocks have been labeled with an apostrophe to indicate that such blocks were written after the failure of disk 1. Such designation is for illustration purposes only (for clarity of explanation) and storage array 26 may not actually store a designator with each block to indicate whether it was written and/or modified prior to or after the failure of disk 1.

Figure 8:
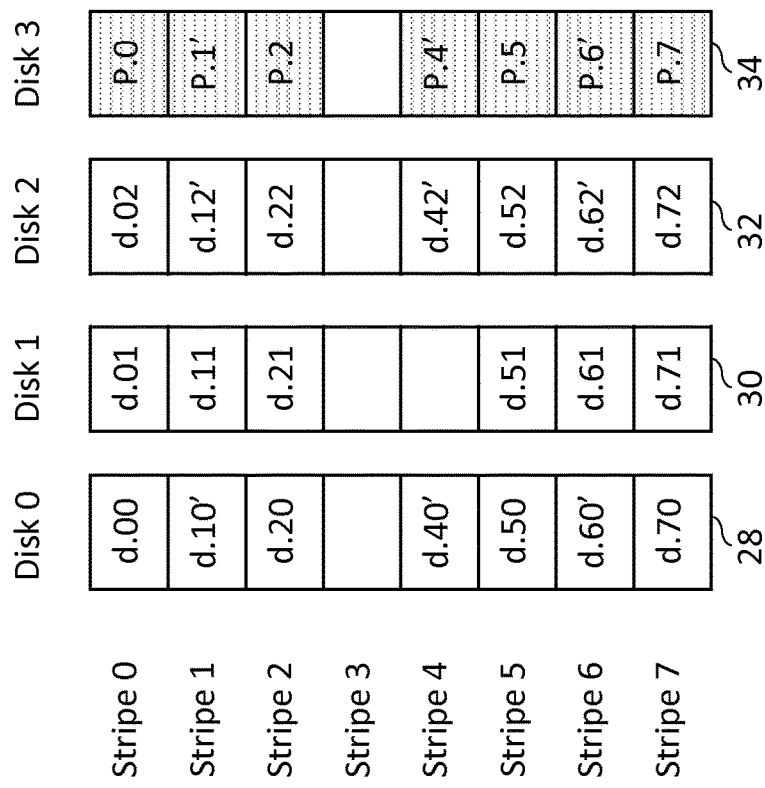
FIG. 8 depicts the data blocks and error-correction blocks of a storage array after the failed storage unit has transitioned back to an operational state, in accordance with one embodiment.

FIG. 8 depicts the state of storage array 26 after disk 1 has been recovered. Assume that the failure of disk 1 did not affect the contents of disk, and upon its recovery, the contents of disk 1 are identical to the contents of disk 1 immediately prior to its failure. One can see that the contents of disk 1 are identical between FIG. 2 and FIG. 8. Now, storage system 12 is tasked with distinguishing which data of disk 1 is stale and requires rebuilding. From the arrangement of data and error-correction blocks of FIG. 8, storage system 12 may be able to determine that stripe 4 needs to be rebuilt on disk 1 (as the absence of data on disk 1 for stripe 4 and the presence of data on the other disks for stripe 4 would indicate that a write to stripe 4 occurred during the failure of disk 1), but it would not be able to determine (from only the information presented in FIG. 8) which other stripes need to be rebuilt on disk 1.

According to one embodiment, storage system 12 reads the storage unit identifier that has been stored in persistent storage (i.e., information depicted in FIG. 5). From the storage unit identifier (i.e., 0001 in the current example), storage system 12 can determine that a partial rebuild may need to be performed on disk 1. Further, the storage system 12 reads the segment identifier that has been stored in persistent storage (i.e., 114 in the current example). From this information, storage system 12 can determine which data segments to rebuild. Since the segment identifiers are allocated in a monotonically increasing manner (at least in the presently discussed embodiment), any data segments that are written to storage array 26 subsequent to the failure of disk 1 will have a segment identifier that is greater than the stored segment identifier. Therefore, in one embodiment, the storage system 12 can rebuild data segments corresponding to segment identifiers that are greater than the stored segment identifier. In the present example, the stored segment identifier was 114, so the data segments that will be rebuilt on disk 1 are 115, 116 and 117, which would correspond to stripes 4, 1 and 6, respectively.

Figure 9:
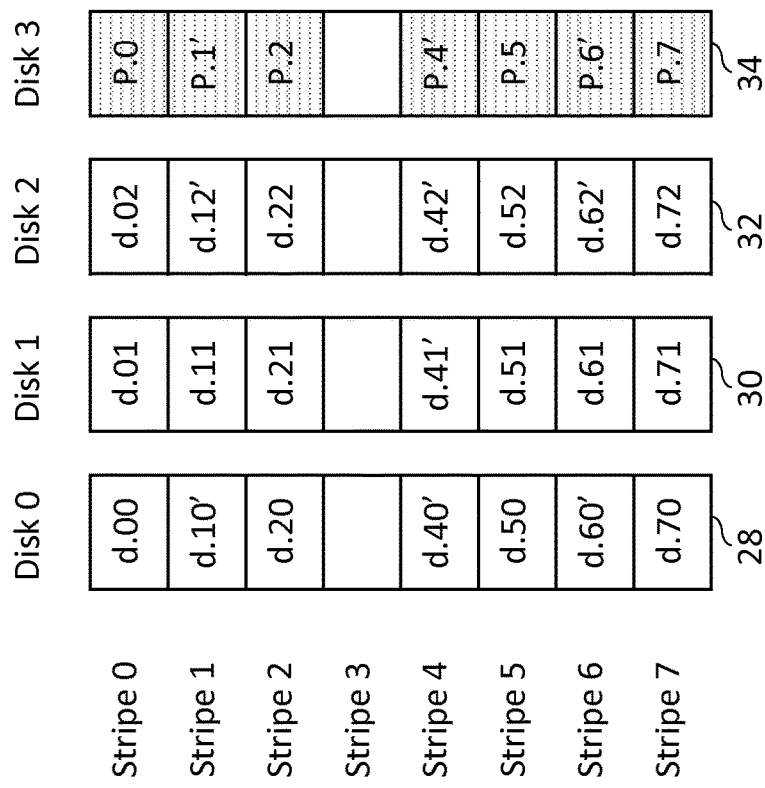
FIG. 9 depicts the data blocks and error-correction blocks of a storage array while one of its storage units is undergoing a partial rebuild process, in accordance with one embodiment.
Figure 10:
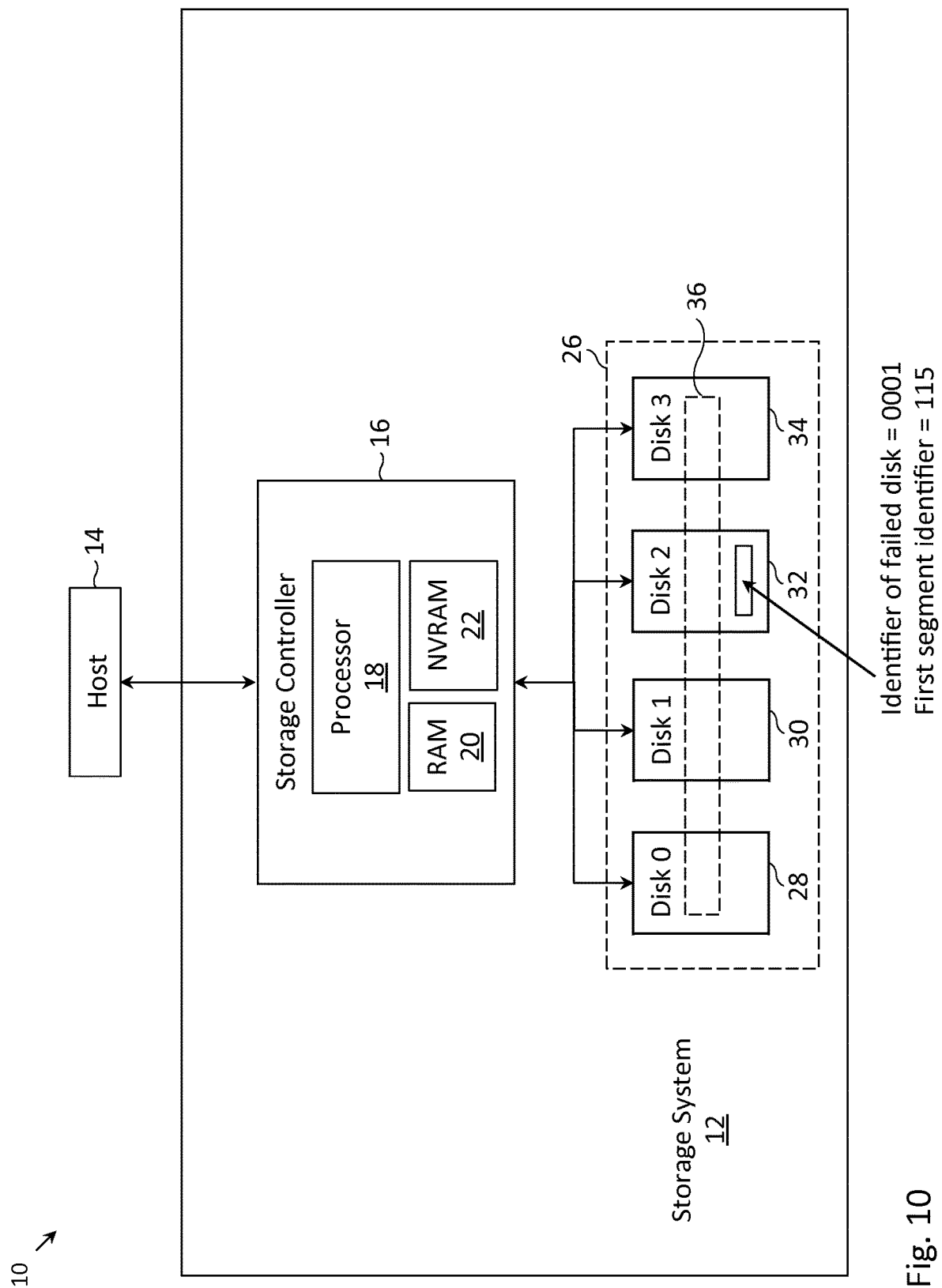
FIG. 10 depicts a storage system communicatively coupled to a host, and in particular information on a storage array that may facilitate the reconstruction of at least some of the contents of a storage unit of the storage array, in accordance with one embodiment.

FIGS. 9-14 illustrate an iterative method to partially rebuild the contents of a failed storage unit, in accordance with one embodiment. First, storage system 12 determines whether the stored segment identifier (i.e., 114 in the current example) is the maximum segment identifier present in segment map 36. If so, the process ends. Since it is not the maximum segment identifier present in segment map 36 (i.e., maximum segment identifier in the current example is 117), storage system 12 rebuilds a portion of the data segment associated with the next higher segment identifier (i.e., next higher segment identifier in segment map 36) on disk 1. In the present example, the next higher segment identifier is 115, which is mapped to stripe number 4. Accordingly, storage system 12 generates data block d.41' (from data blocks d.40' and d.42' and error-correction block P.4') and stores data block d.41' on disk 1, as depicted in FIG. 9. It is noted that the specific techniques to generate a data block from other data blocks and redundant information (e.g., error-correction blocks) is known in the art, and will not be explained herein for conciseness. Next, the stored segment identifier is advanced to the next higher segment identifier in the segment map. In the present example, the stored segment identifier is advanced to 115, as depicted in FIG. 10.

Figure 11:
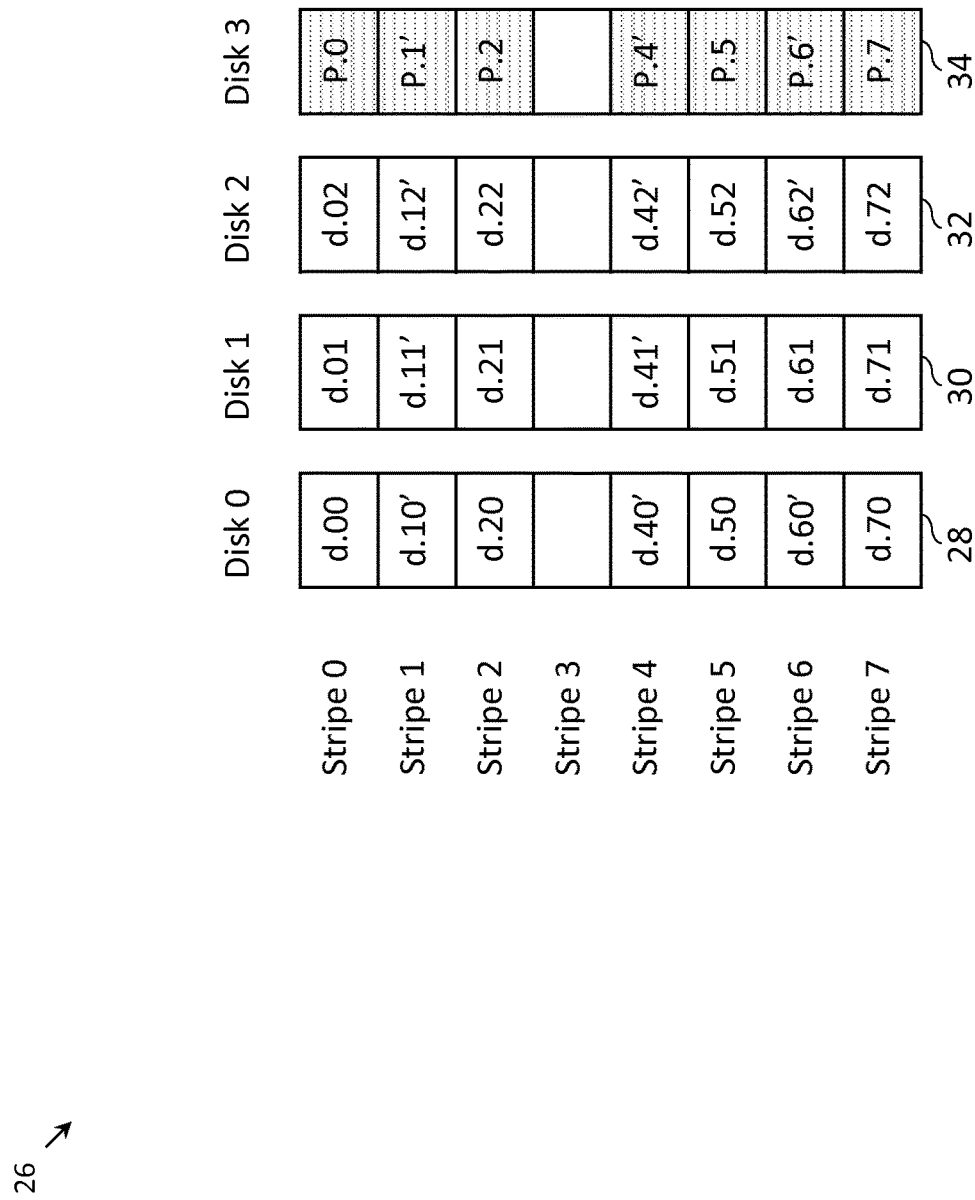
FIG. 11 depicts the data blocks and error-correction blocks of a storage array while one of its storage units is undergoing a partial rebuild process, in accordance with one embodiment.
Figure 12:
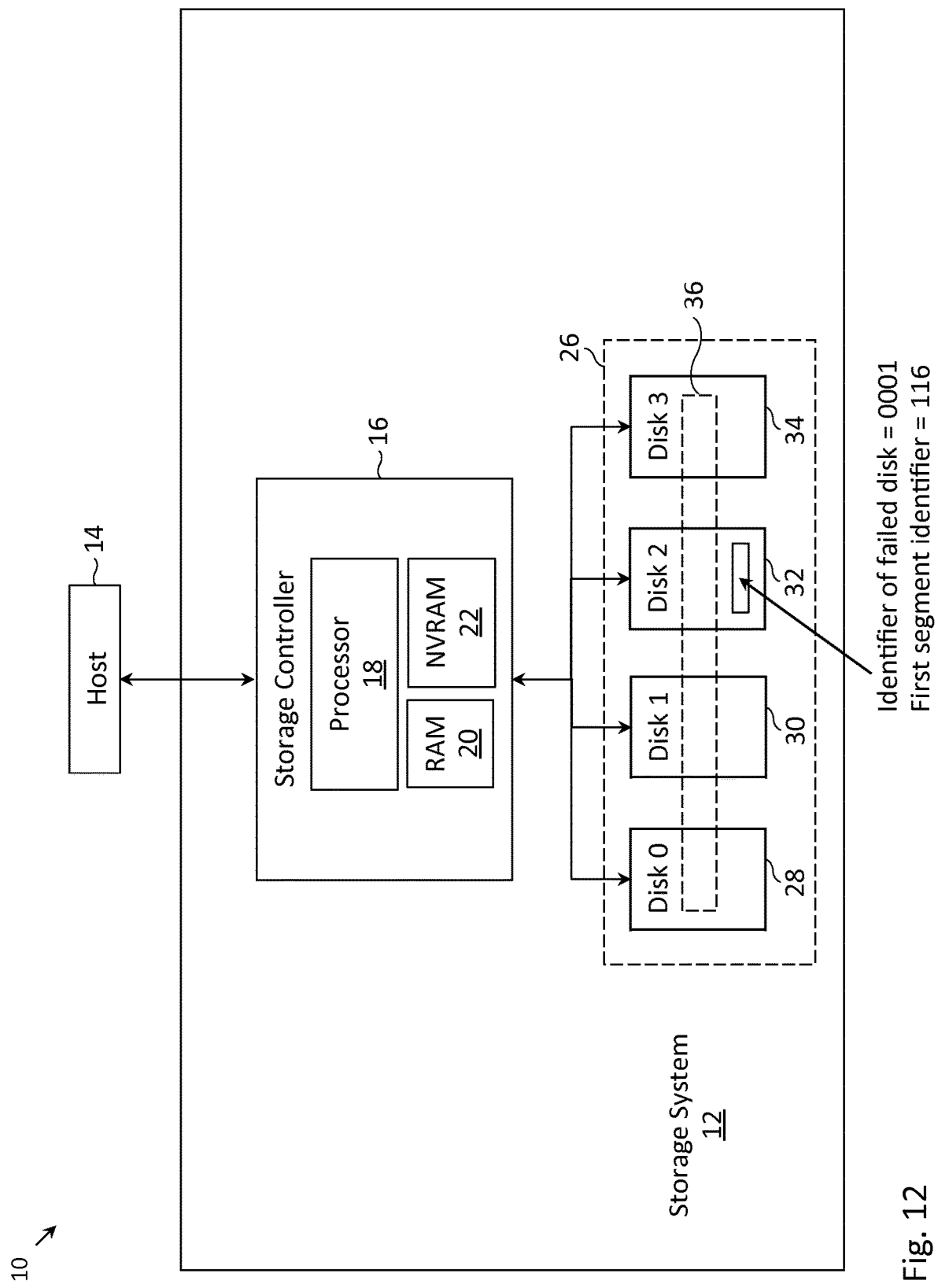
FIG. 12 depicts a storage system communicatively coupled to a host, and in particular information on a storage array that may facilitate the reconstruction of at least some of the contents of a storage unit of the storage array, in accordance with one embodiment.

Next, storage system 12 determines whether the stored segment identifier (i.e., segment identifier 115) is the maximum segment identifier present in segment map 36. If so, the process ends. Since it is not the maximum segment identifier present in segment map 36, storage system 12 rebuilds a portion of the data segment associated with the next higher segment identifier on disk 1. In the present example, the next higher segment identifier is 116, which is mapped to stripe number 1. Accordingly, storage system 12 generates data block d.11' (from data blocks d.10' and d.12' and error-correction block P.1') and stores data block d.11' on disk 1, as depicted in FIG. 11. Next, the stored segment identifier is advanced to the next higher segment identifier in the segment map. In the present example, the stored segment identifier is advanced to 116, as depicted in FIG. 12.

Figure 13:
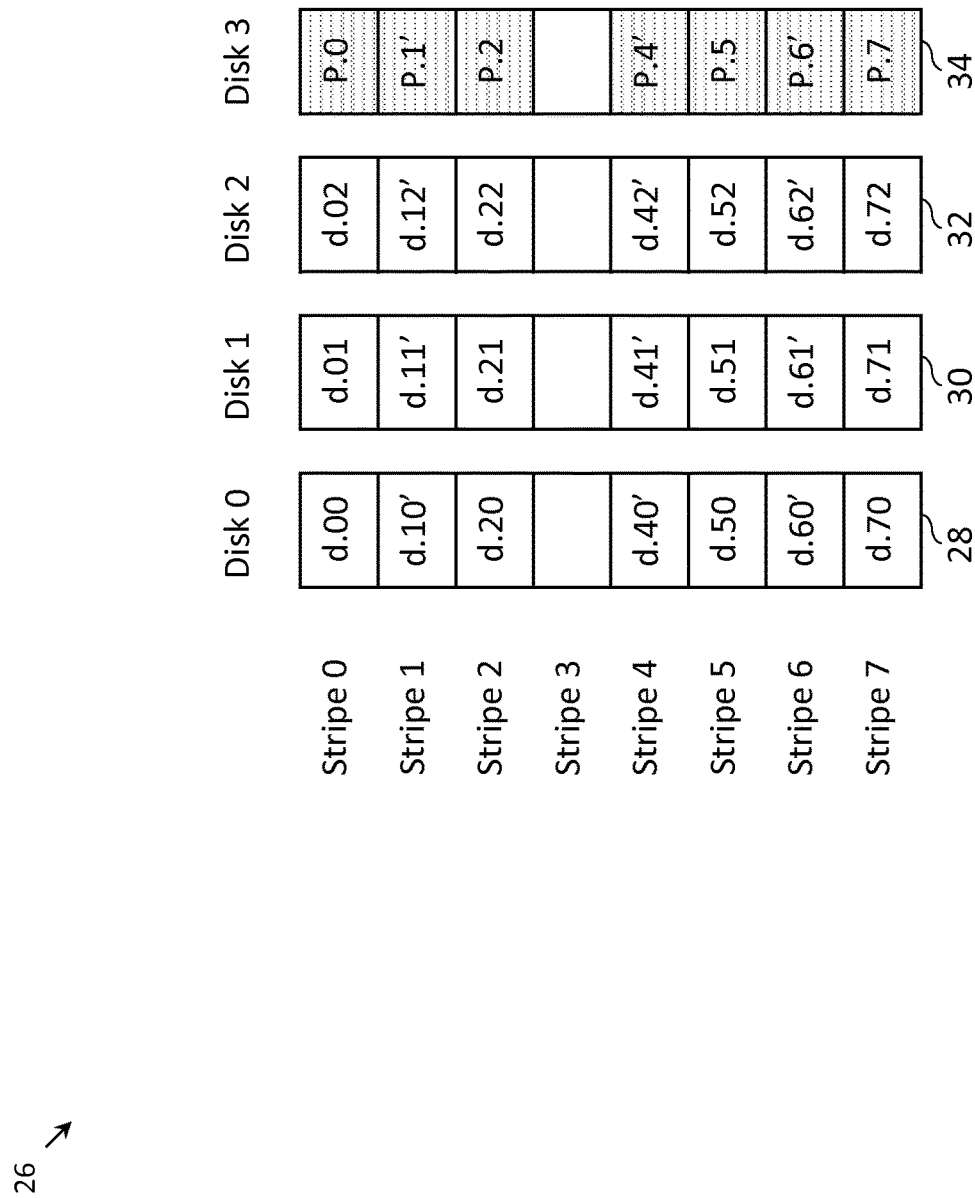
FIG. 13 depicts the data blocks and error-correction blocks of a storage array while one of its storage units is undergoing a partial rebuild process, in accordance with one embodiment.
Figure 14:
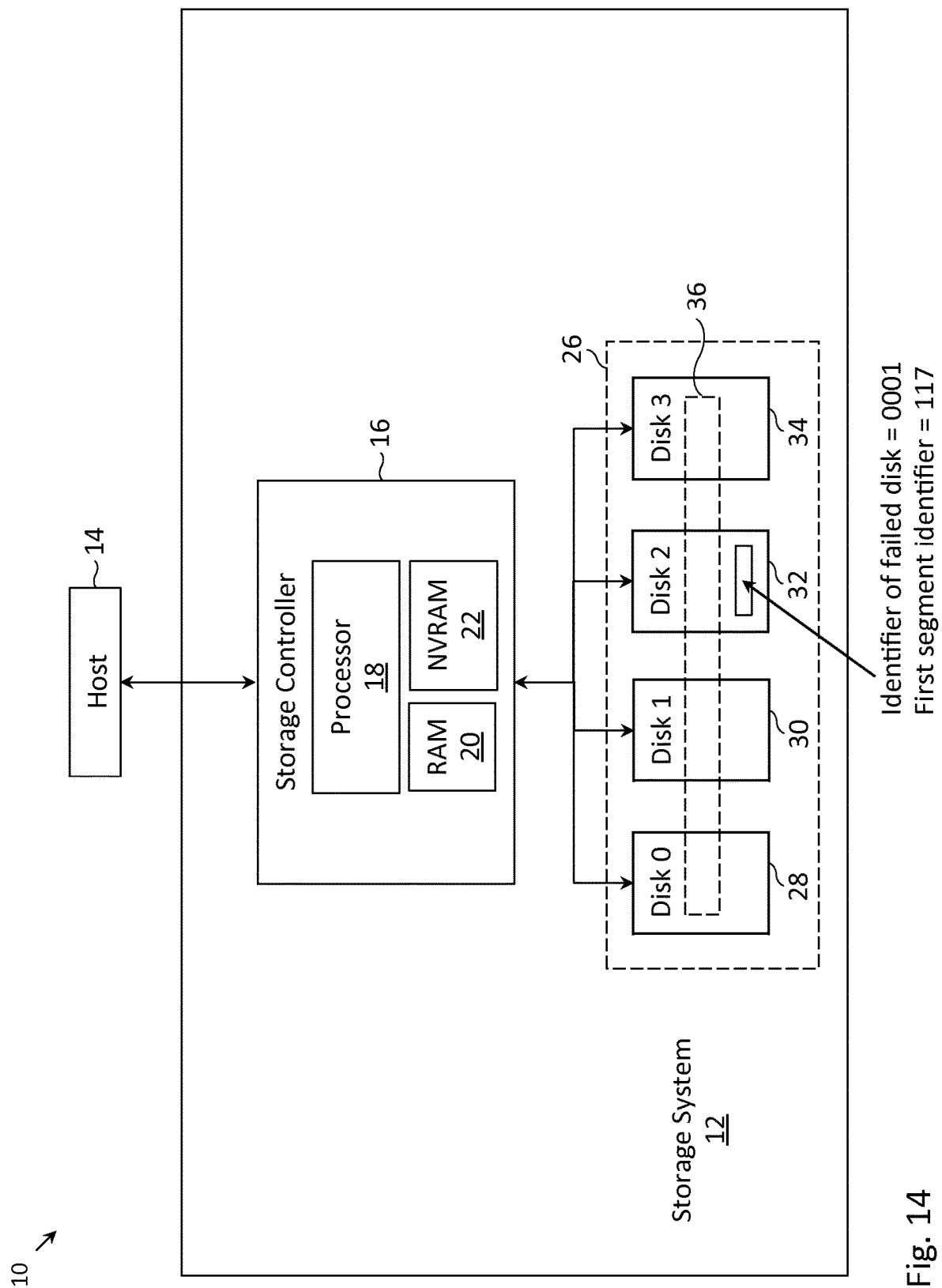
FIG. 14 depicts a storage system communicatively coupled to a host, and in particular information on a storage array that may facilitate the reconstruction of at least some of the contents of a storage unit of the storage array, in accordance with one embodiment.

Next, storage system 12 determines whether the stored segment identifier (i.e., segment identifier 116) is the maximum segment identifier present in segment map 36. If so, the process ends. Since it is not the maximum segment identifier present in segment map 36, storage system 12 rebuilds a portion of the data segment associated with the next higher segment identifier on disk 1. In the present example, the next higher segment identifier is 117, which is mapped to stripe number 6. Accordingly, storage system 12 generates data block d.61' (from data blocks d.60' and d.62' and error-correction block P.6') and stores data block d.61' on disk 1, as depicted in FIG. 13. Next, the stored segment identifier is advanced to the next higher segment identifier in the segment map. In the present example, the stored segment identifier is advanced to 117, as depicted in FIG. 14.

Next, storage system 12 determines whether the stored segment identifier (i.e., 117) is the maximum segment identifier present in segment map 36. Since it is the maximum segment identifier in segment map 36, the partial rebuild process concludes.

To emphasize the advantages of one embodiment of the present invention, storage system 12 was able to determine which data segments to rebuild based solely on segment map 36 and a single segment identifier stored on the persistent storage. Segment map 36 is required for normal operation of storage system 12, so the only storage overhead required to enable a partial rebuild of a failed storage unit is the storing of the segment identifier on the persistent storage. During the partial rebuild process, the determination of whether a data segment needs to be rebuilt is also a computationally efficient step, only requiring that the segment identifier of the data segment be compared to the stored segment identifier.

Figure 15:
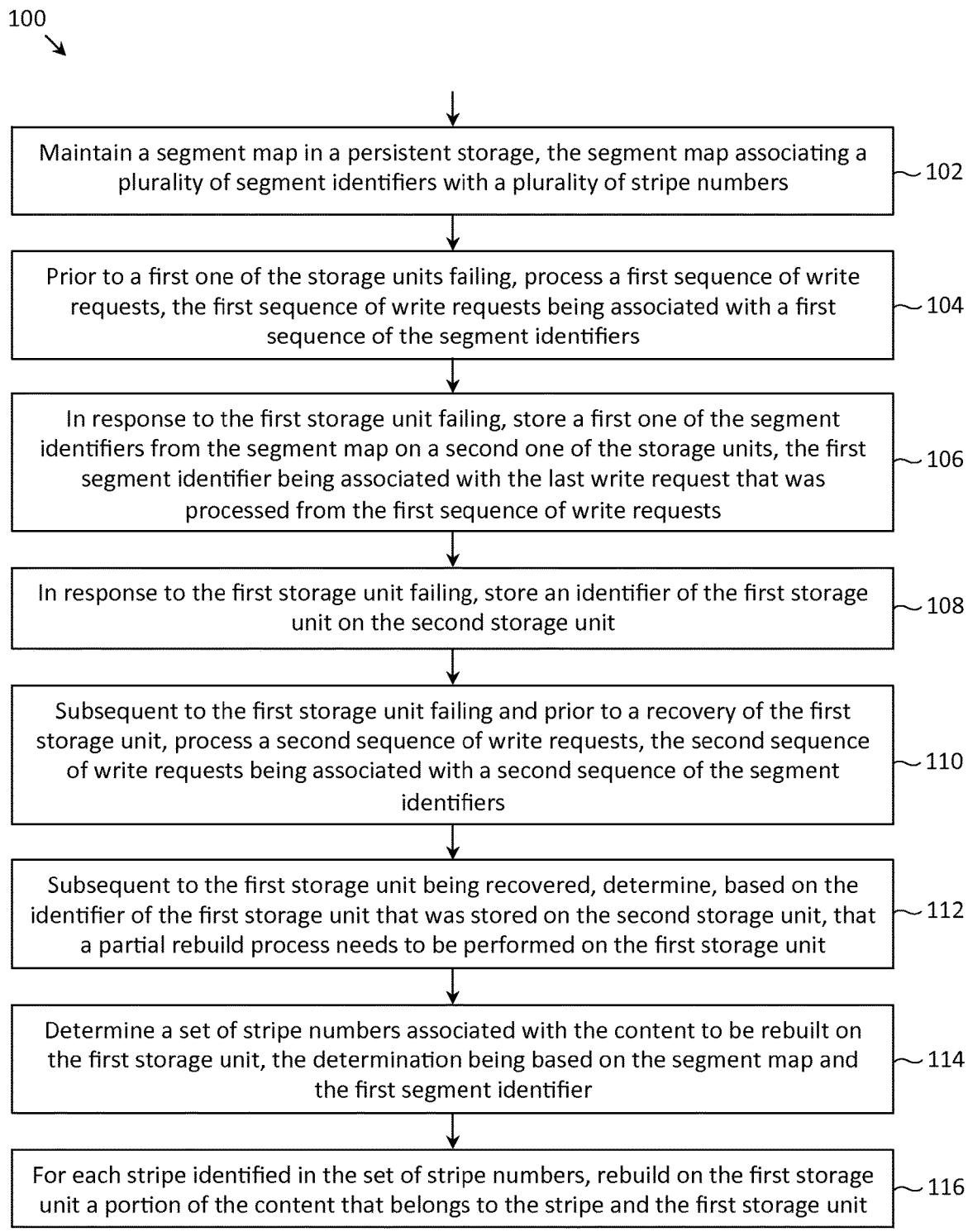
FIG. 15 depicts a flow diagram for storing information that may be used in the process of reconstructing at least some of the contents of a storage unit, and using that information to reconstruct at least some of the contents of the storage unit, in accordance with one embodiment.

In FIGS. 15-20, various processes associated with embodiments of the present invention are depicted in the form of flow diagrams. FIG. 15 depicts flow diagram 100 for storing information that may be used in the process of reconstructing at least some of the contents of a storage unit, and using that information to reconstruct at least some of the contents of the storage unit, in accordance with one embodiment. At step 102, storage system 12 may maintain a segment map in a persistent storage, the segment map associating a plurality of segment identifiers with a plurality of stripe numbers. At step 104, prior to a first one of the storage units failing, storage system 12 may process a first sequence of write requests, the first sequence of write requests being associated with a first sequence of the segment identifiers. In one embodiment, the first sequence of the segment identifiers is a monotonically increasing sequence, while in another embodiment, the first sequence of the segment identifiers is a monotonically decreasing sequence. At step 106, in response to the first storage unit failing, storage system 12 may store a first one of the segment identifiers from the segment map on a second one of the storage units, the first segment identifier being associated with the last write request that was processed from the first sequence of write requests. At step 108, in response to the first storage unit failing, storage system 12 may store an identifier of the first storage unit on the second storage unit. At step 110, subsequent to the first storage unit failing and prior to a recovery of the first storage unit, storage system 12 may process a second sequence of write requests, the second sequence of write requests being associated with a second sequence of the segment identifiers. In one embodiment, the second sequence of the segment identifiers is a monotonically increasing sequence, while in another embodiment, the second sequence of the segment identifiers is a monotonically decreasing sequence. At step 112, subsequent to the first storage unit being recovered, storage system 12 may determine, based on the identifier of the first storage unit that was stored on the second storage unit, that a partial rebuild process needs to be performed on the first storage unit. At step 114, storage system 12 may determine a set of stripe numbers associated with the content to be rebuilt on the first storage unit, the determination being based on the segment map and the first segment identifier. In one embodiment, the determination may be based solely on the segment map and the first segment identifier. The set of stripe numbers that are determined may identify stripes associated with data segments having segment identifiers greater than the first segment identifier. Finally, at step 116, storage system 12 may, for each stripe identified in the set of stripe numbers, rebuild on the first storage unit a portion of the content that belongs to the stripe and the first storage unit.

Figure 16:
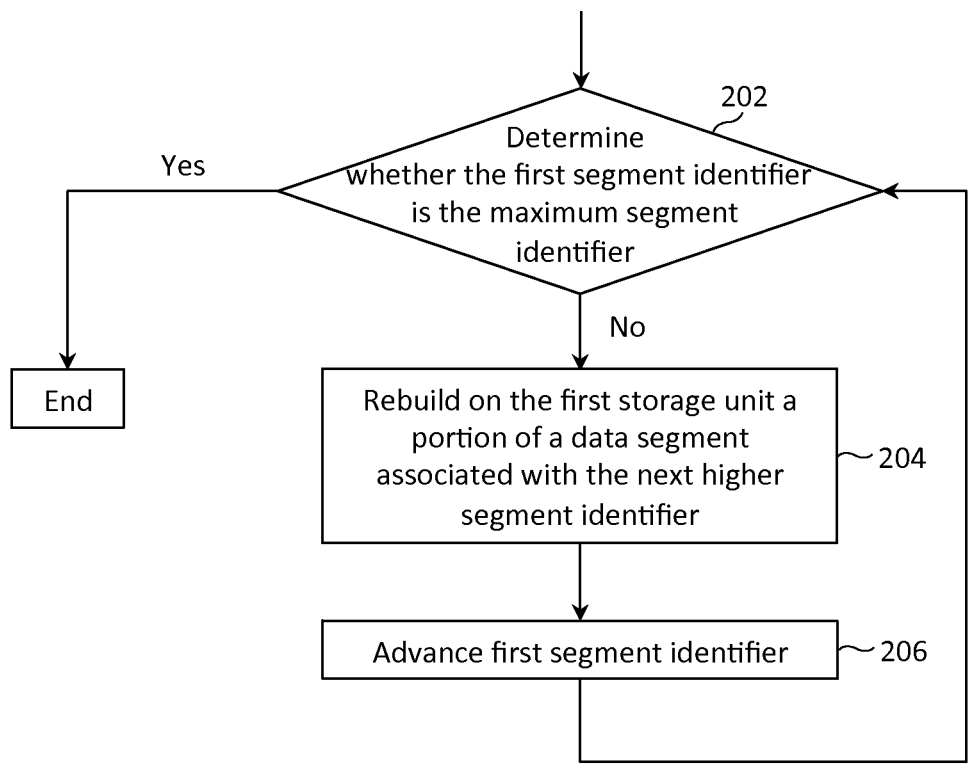
FIG. 16 depicts a flow diagram for reconstructing at least some of the contents of a storage unit, in accordance with one embodiment.

FIG. 16 depicts flow diagram 200 that elaborates upon step 116 of FIG. 15. At step 202, storage system 12 may determine whether the first segment identifier is the maximum segment identifier. If so, the partial rebuild process ends. Otherwise, storage system 12 may rebuild on the first storage unit a portion of a data segment associated with the next higher segment identifier in segment map (step 204). At step 206, the first segment identifier may be advanced to the next largest segment identifier in segment map 36. The process may then repeat to previously described step 202.

Figure 17:
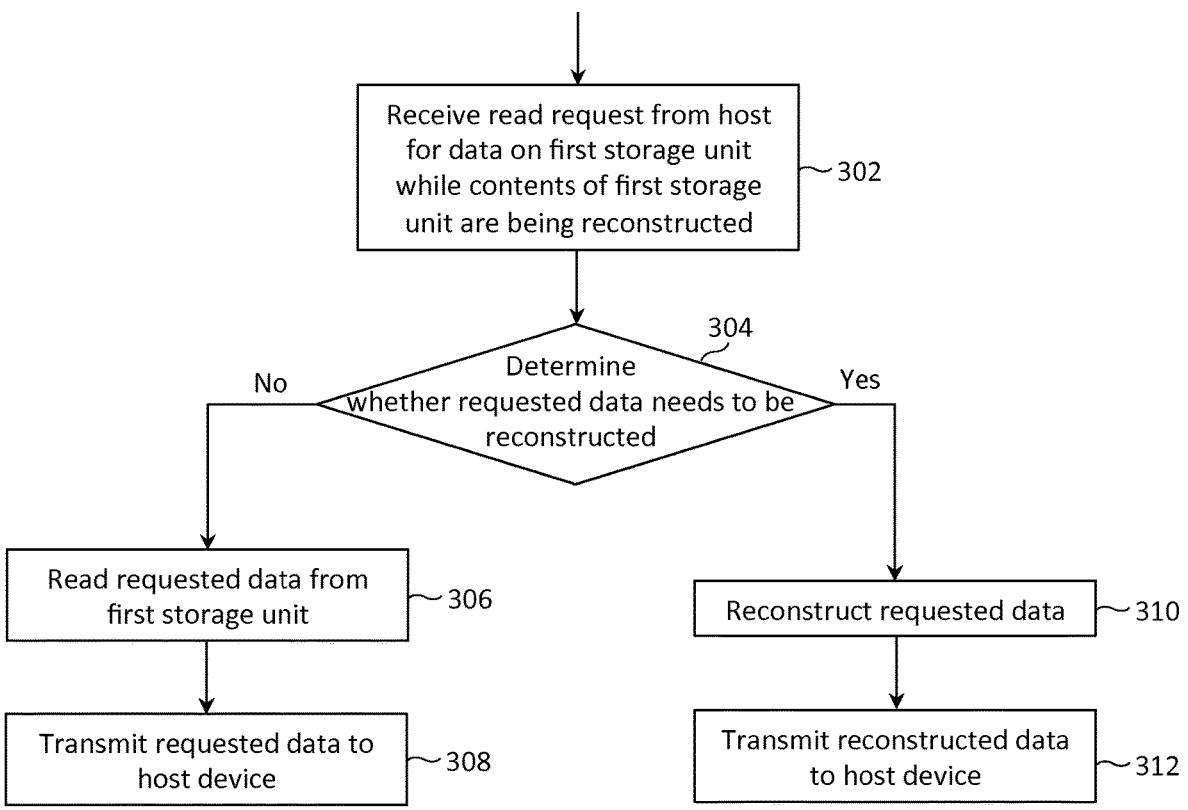
FIG. 17 depicts a flow diagram for processing a read request while at least some of the contents of a storage unit are being reconstructed, in accordance with one embodiment.

FIG. 17 depicts flow diagram 300 for processing a read request while at least some of the contents of a storage unit are being reconstructed, in accordance with one embodiment. At step 302, storage system 12 may receive a read request from host 14 for data on the first storage unit while contents of the first storage unit are being reconstructed. At step 304, storage system 12 may determine whether the requested data needs to be reconstructed. In one embodiment, such determination may involve comparing the segment identifier associated with the read request with the first segment identifier. If the segment identifier of the read request is less than or equal to the first segment identifier, the requested data may not need to be reconstructed and the requested data can be directly read from the first storage unit (step 306) and transmitted to the host device (308). Otherwise, if the segment identifier of the read request is greater than the first segment identifier, the requested data may be reconstructed (step 310) and the reconstructed data may be transmitted to the host device (step 312).

Figure 18:
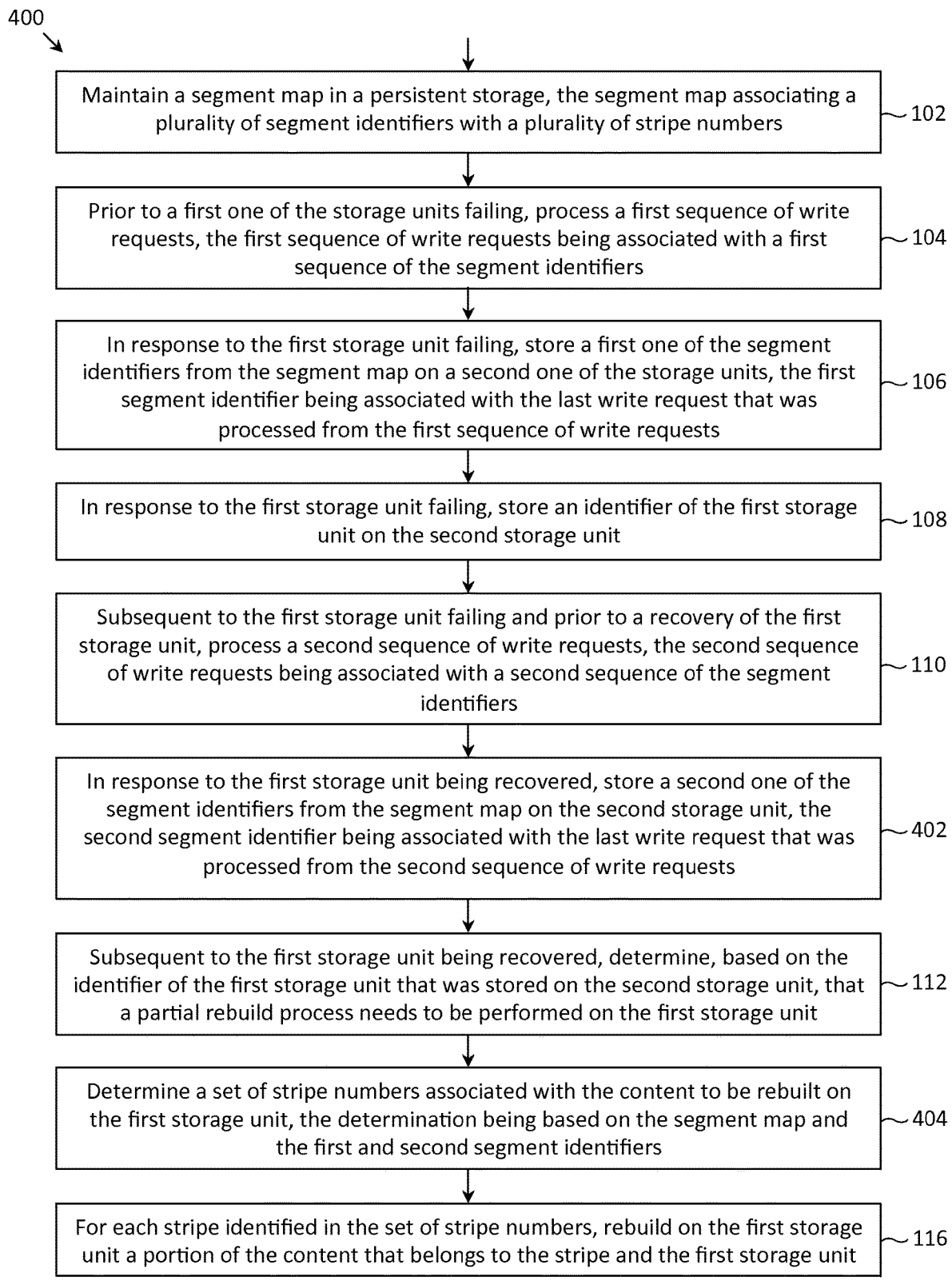
FIG. 18 depicts a flow diagram for storing information that may be used in the process of reconstructing at least some of the contents of a storage unit, and using that information to reconstruct at least some of the contents of the storage unit, in accordance with one embodiment.
Figure 19:
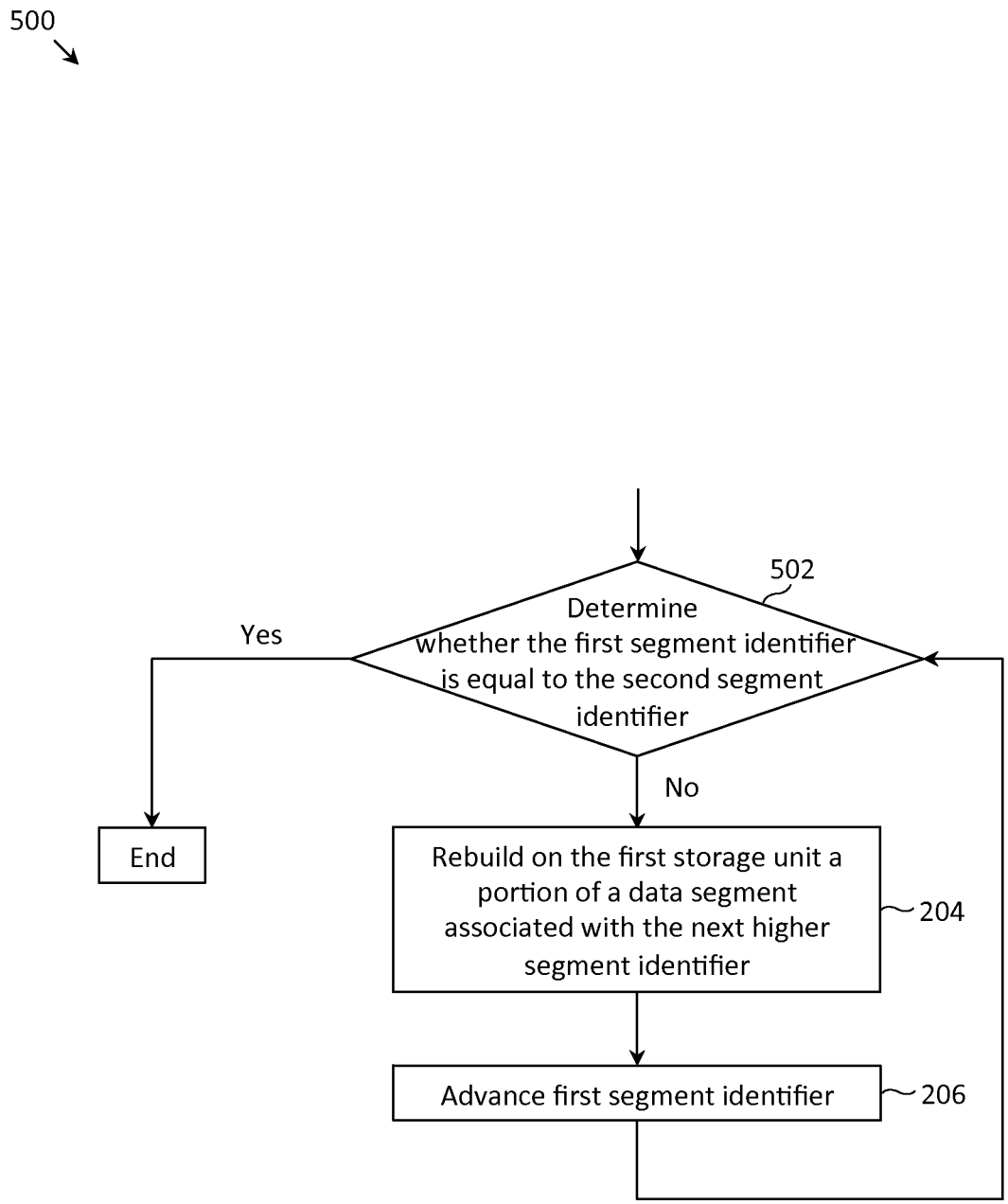
FIG. 19 depicts a flow diagram for reconstructing at least some of the contents of a storage unit, in accordance with one embodiment.
Figure 20:
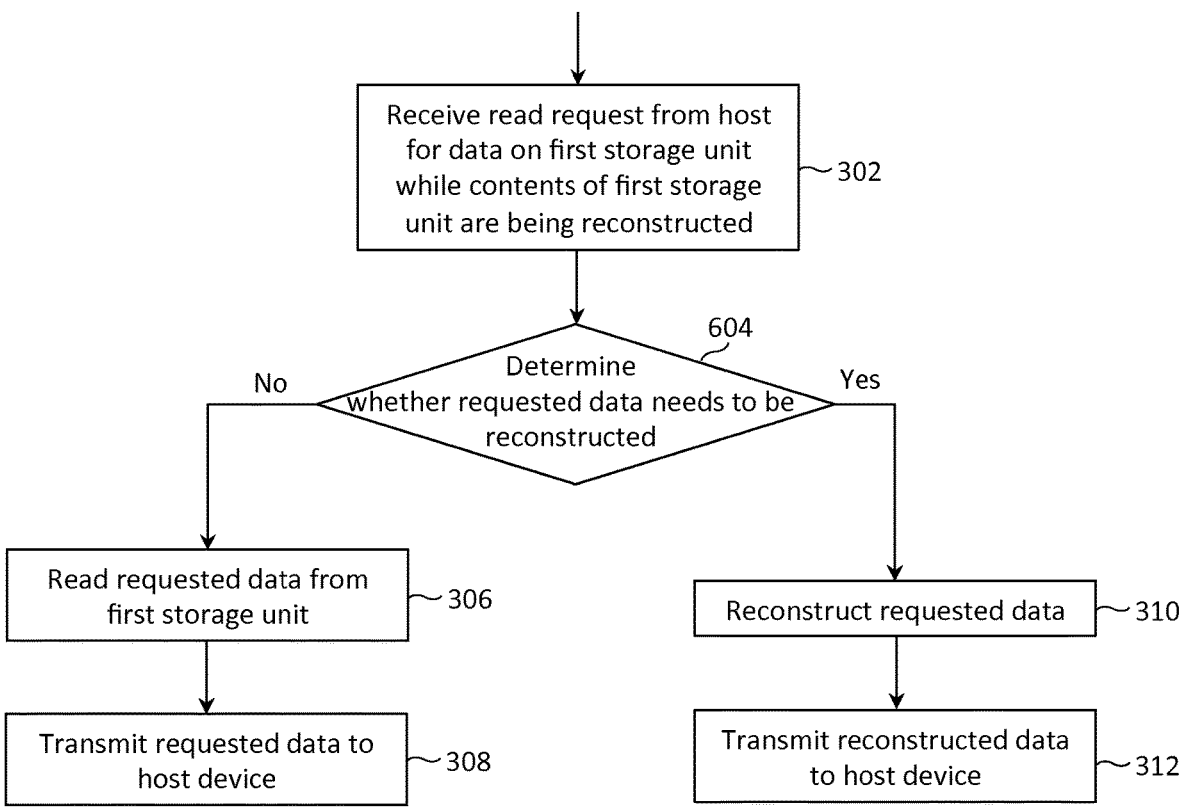
FIG. 20 depicts a flow diagram for processing a read request while at least some of the contents of a storage unit are being reconstructed, in accordance with one embodiment.

FIGS. 18-20 depict a variant of the processes depicted in FIGS. 15-17. Description for steps already described will not be provided for conciseness. In flow diagram 400 of FIG. 18, storage system 12, in addition to recording the first segment identifier, also records a second segment identifier (step 402). The second segment identifier may be associated with the last write request that was processed from the second sequence of write requests (i.e., the sequence of write requests while the storage array was in a degraded mode of operation). In other words, the second segment identifier may identify the last data segment that was written during the degraded mode of operation, and hence may identify the last data segment that requires reconstruction. At step 404, storage system 12 may determine a set of stripe numbers associated with content to be rebuilt on the first storage unit, the determination being based on the segment map and the first and second segment identifiers. In one embodiment, the determination is solely based on the segment map and the first and second segment identifiers. The set of stripe numbers that are determined may identify stripes associated with data segments having segment identifiers greater than the first segment identifier and less than or equal to the second segment identifier.

It is noted that the process of FIG. 18 may eliminate some redundant computation, as compared to the process of FIG. 15. For instance, if data segments are written to storage array 26 after the first storage unit has been recovered, no data reconstruction should be needed for such data segments. Nevertheless, the process of FIG. 15 may perform data reconstruction for such data segments (even though it is not needed), while the process of FIG. 18 will avoid such data reconstruction.

Flow diagram 500 (depicted in FIG. 19) is similar to flow diagram 200 (depicted in FIG. 16), except for step 502. In step 502, storage system 12 may determine whether the first segment identifier is equal to the second segment identifier as a termination condition, rather than determining whether the first segment identifier is the maximum segment identifier (as in step 202).

Flow diagram 600 (depicted in FIG. 20) is similar to flow diagram 300 (depicted in FIG. 17), except for step 604. In step 604, storage system 12 may determine whether the requested data needs to be reconstructed by comparing the segment identifier associated with the read request with the first and second segment identifiers. More specifically, storage system 12 may determine whether the segment identifier associated with the read request is greater than the first segment identifier and less than or equal to the second segment identifier. If so, the requested data is reconstructed (step 310), otherwise, the requested data can be read from the first storage unit (step 306).

Figure 21:
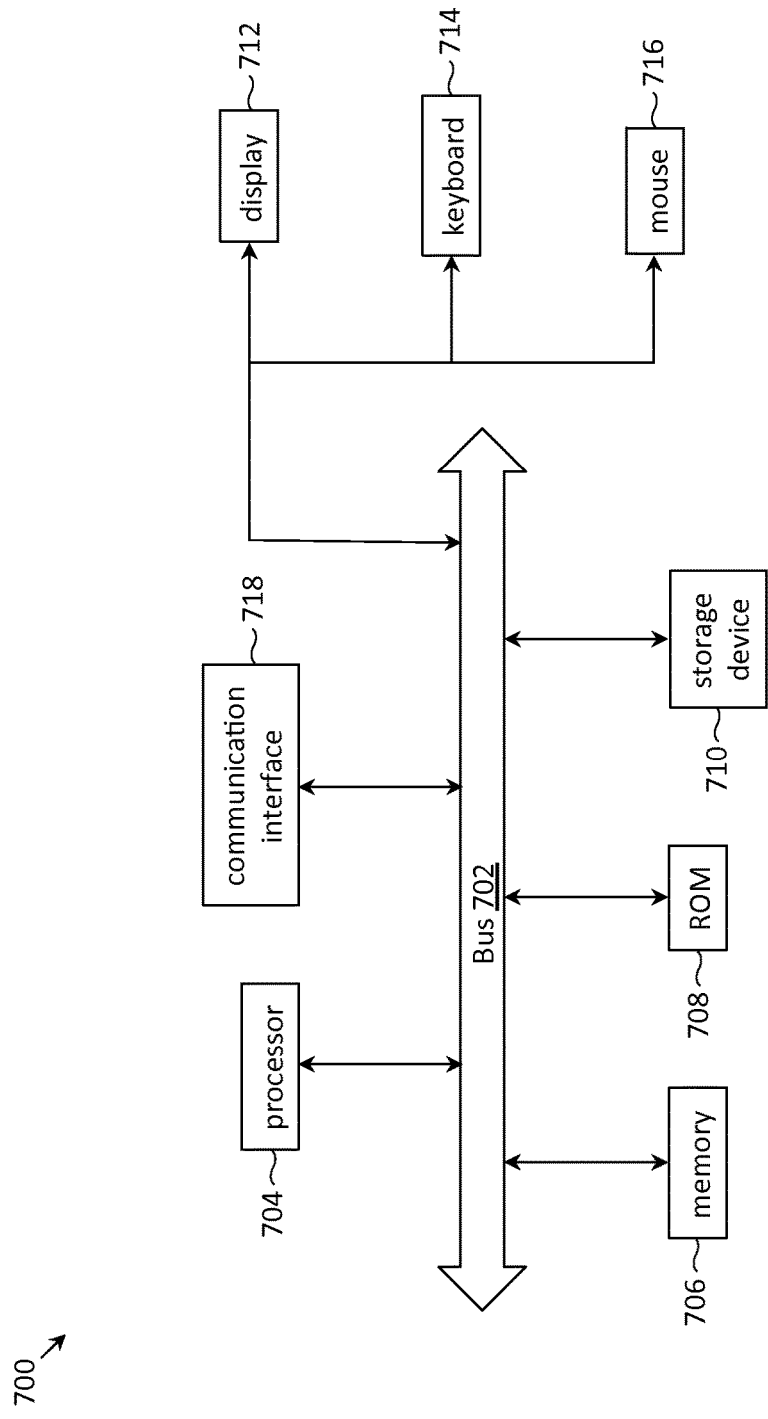
FIG. 21 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 21 provides an example of a system 700 that is representative of any of the computing systems discussed herein. Further, computer system 700 may be representative of a system that performs any of the processes depicted in FIGS. 15-20. Note, not all of the various computer systems have all of the features of system 700. For example, certain ones of the computer systems discussed above may not include a display inasmuch as the display function may be provided by a client computer communicatively coupled to the computer system or a display function may be unnecessary. Such details are not critical to the present invention.

System 700 includes a bus 702 or other communication mechanism for communicating information, and a processor 704 coupled with the bus 702 for processing information. Computer system 700 also includes a main memory 706, such as a random access memory (RAM) or other dynamic storage device, coupled to the bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to the bus 702 for storing static information and instructions for the processor 704. A storage device 710, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 704 can read, is provided and coupled to the bus 702 for storing information and instructions (e.g., operating systems, applications programs and the like).

Computer system 700 may be coupled via the bus 702 to a display 712, such as a flat panel display, for displaying information to a computer user. An input device 714, such as a keyboard including alphanumeric and other keys, may be coupled to the bus 702 for communicating information and command selections to the processor 704. Another type of user input device is cursor control device 716, such as a mouse, a trackball, or cursor direction keys for communicating direction information and command selections to processor 704 and for controlling cursor movement on the display 712. Other user interface devices, such as microphones, speakers, etc. are not shown in detail but may be involved with the receipt of user input and/or presentation of output.

The processes referred to herein may be implemented by processor 704 executing appropriate sequences of computer-readable instructions contained in main memory 706. Such instructions may be read into main memory 706 from another computer-readable medium, such as storage device 710, and execution of the sequences of instructions contained in the main memory 706 causes the processor 704 to perform the associated actions. In alternative embodiments, hard-wired circuitry or firmware-controlled processing units (e.g., field programmable gate arrays) may be used in place of or in combination with processor 704 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 700 or similar electronic computing device, that manipulates and transforms data represented as physical (electronic) quantities within its registers and memories into other data similarly represented as physical quantities within its memories or registers or other such information storage, transmission or display devices.

Computer system 700 also includes a communication interface 718 coupled to the bus 702. Communication interface 718 may provide a two-way data communication channel with a computer network, which provides connectivity to and among the various computer systems discussed above. For example, communication interface 718 may be a local area network (LAN) card to provide a data communication connection to a compatible LAN, which itself is communicatively coupled to the Internet through one or more Internet service provider networks. The precise details of such communication paths are not critical to the present invention. What is important is that computer system 700 can send and receive messages and data through the communication interface 718 and in that way communicate with hosts accessible via the Internet.

Thus, methods and systems for reconstructing at least some of the contents of a storage unit following the failure of the storage unit have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for a storage system having a storage controller communicatively coupled to a storage array, the storage controller comprising a processor, volatile memory and non-volatile memory, and the storage array having a plurality of storage drives, the method comprising:
   maintaining, by the storage controller external to each of the storage drives, a single segment map for all of the storage drives in a persistent storage, each entry of the segment map mapping a segment identifier to a stripe number;
   prior to a first one of the storage drives failing, processing by the storage controller a first sequence of write requests, the first sequence of write requests being associated with a first sequence of the segment identifiers;
   when the first storage drive fails and becomes unresponsive to any requests, storing by the storage controller a first one of the segment identifiers from the segment map on a plurality of the storage drives other than the failed first storage drive, the first segment identifier being associated with the last data segment to be fully written to the storage array prior to the failure of the first storage drive;
   in response to the first storage drive failing, storing an identifier of the first storage drive on the plurality of the storage drives other than the failed first storage drive;
   subsequent to the first storage drive failing, processing by the storage controller a second sequence of write requests, the second sequence of write requests being associated with a second sequence of the segment identifiers;
   subsequent to the first storage drive being recovered, determining by the storage controller data segments associated with content to be rebuilt on the first storage drive, wherein the determination by the storage controller is based on the first segment identifier and the single segment map for all of the storage drives; and
   rebuilding, by the storage controller and on the first storage drive, content of data segments corresponding to ones of the segment identifiers that are greater than the first segment identifier.

2. The method of claim 1, further comprising, subsequent to the recovery of the first storage drive, determining that a partial rebuild process needs to be performed on the first storage drive based on the identifier of the first storage drive that was stored on the plurality of the storage drives other than the failed first storage drive.

3. A storage system, comprising:
   a storage array having a plurality of storage drives; and
   a storage controller communicatively coupled to the storage array, the storage controller comprising a processor, and a memory including software instructions that, when executed by the processor, cause the processor to:
   maintain a single segment map for all of the storage drives, each entry of the segment map mapping a segment identifier to a stripe number;
   prior to a first one of the storage drives failing, process a first sequence of write requests, the first sequence of write requests being associated with a first sequence of the segment identifiers;
   when the first storage drive fails and becomes unresponsive to any requests, store a first one of the segment identifiers from the segment map on a plurality of the storage drives other than the failed storage drive, the first segment identifier being associated with the last data segment to be fully written to the storage array prior to the failure of the first storage drive;
   in response to the first storage drive failing, store an identifier of the first storage drive on the plurality of storage drives other than the failed first storage drive;
   subsequent to the first storage drive failing, process a second sequence of write requests, the second sequence of write requests being associated with a second sequence of the segment identifiers;
   subsequent to the first storage drive being recovered, determine data segments associated with content to be rebuilt on the first storage drive, wherein the determination is based on the first segment identifier and the single segment map for all of the storage drives; and
   rebuild on the first storage drive content of data segments corresponding to ones of the segment identifiers that are greater than the first segment identifier.

4. The storage system of claim 3, further comprising software instructions on the memory that, when executed by the processor, cause the processor to, subsequent to the recovery of the first storage drive, determine that a partial rebuild process needs to be performed on the first storage drive based on the identifier of the first storage drive that was stored on the plurality of storage drives other than the failed first storage drive.

5. A non-transitory machine-readable storage medium for a processor of a storage controller, the storage controller communicatively coupled to a storage array, the storage array having a plurality of storage drives, and the non-transitory machine-readable storage medium comprising software instructions that, when executed by the processor, cause the processor to:

maintain a single segment map for all of the storage drives in one or more of the storage drives, each entry of the segment map mapping a segment identifier to a stripe number;

prior to a first one of the storage drives failing, process a first sequence of write requests, the first sequence of write requests being associated with a first sequence of the segment identifiers;

when the first storage drive fails and becomes unresponsive to any requests, store a first one of the segment identifiers from the segment map on a plurality of the storage drives other than the failed storage drive, the first segment identifier being associated with the last data segment to be fully written to the storage array prior to the failure of the first storage drive;

in response to the first storage drive failing, store an identifier of the first storage drive on the plurality of storage drives other than the failed first storage drive;

subsequent to the first storage drive failing, process a second sequence of write requests, the second sequence of write requests being associated with a second sequence of the segment identifiers;

subsequent to the first storage drive being recovered, determine data segments associated with content to be rebuilt on the first storage drive, wherein the determination is based on the first segment identifier and the single segment map for all of the storage drives; and rebuild on the first storage drive content of data segments corresponding to ones of the segment identifiers that are greater than the first segment identifier.

6. The non-transitory machine-readable storage medium of claim 5, further comprising software instructions that, when executed by the processor, cause the processor to, subsequent to the recovery of the first storage drive, determine that a partial rebuild process needs to be performed on the first storage drive based on the identifier of the first storage drive that was stored on the plurality of storage drives other than the failed first storage drive.

* * * * *